(12) United States Patent
Nagai (10) Patent No.: US 7,271,778 B1
(45) Date of Patent: Sep. 18, 2007

(54) ANTENNA DEVICE AND RADAR DEVICE USING THE SAME

(75) Inventor: Tomohiro Nagai, Nagaokakyo (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 11/581,567

(22) Filed: Oct. 17, 2006

Related U.S. Application Data

(63) Continuation of application No. PCT/JP05/06239, filed on Mar. 31, 2005.

(30) Foreign Application Priority Data

May 21, 2004  (JP) .............................. 2004-151598

(51) Int. Cl.
*H01Q 13/00* (2006.01)
(52) U.S. Cl. .................. 343/781 R; 343/840
(58) Field of Classification Search ................ 343/840, 343/757, 779, 781 R, 786
See application file for complete search history.

(56) References Cited

U.S. PATENT DOCUMENTS

| | | | | |
|---|---|---|---|---|
| 2,632,851 | A | * | 3/1953 | Lees et al. .................. 343/768 |
| 6,087,985 | A | * | 7/2000 | Rummeli et al. ........... 342/359 |
| 6,741,216 | B2 | * | 5/2004 | Inasawa et al. ............. 343/754 |
| 7,095,380 | B2 | * | 8/2006 | Yoneda et al. .............. 343/786 |

FOREIGN PATENT DOCUMENTS

| | | |
|---|---|---|
| JP | 8-321710 | 12/1996 |
| JP | 2693497 | 9/1997 |
| JP | 11-88029 | 3/1999 |
| JP | 11-303146 | 11/1999 |
| JP | 2004-112660 | 4/2004 |

OTHER PUBLICATIONS

Written Opinion dated May 31, 2005 (with English translation).
International Search Report dated May 31, 2005.

* cited by examiner

*Primary Examiner*—Hoang V. Nguyen
(74) *Attorney, Agent, or Firm*—Dickstein, Shapiro, LLP.

(57) ABSTRACT

An antenna device having a primary radiator that includes a transmission portion formed of a cylindrical waveguide extending in a direction parallel to the frontward direction of the antenna device, and a radiation portion of a rectangular horn shape, extending in a direction perpendicular to the above-described frontward direction. The radiation portion is rotatably connected, by a rotary joint, to a waveguide of which the center axis in the extending direction conforms to that of the transmission portion. A reflector is disposed about the rotation axis of the primary radiator along the rotation axis direction thereof, and has a reflection surface around the entire peripheral direction of the primary radiator. The reflector is disposed at a predetermined attitude with respect to the primary radiator so as to obtain a predetermined directivity.

11 Claims, 6 Drawing Sheets

ANTENNA DEVICE AND RADAR DEVICE USING THE SAME

CROSS REFERENCE TO RELATED APPLICATIONS

The present application is a continuation of International Application No. PCT/JP2005/006239, filed Mar. 31, 2005, which claims priority to Japanese Patent Application No. JP2004-151598, filed May 21, 2004, the entire contents of each of these applications being incorporated herein by reference in their entirety.

FIELD OF THE INVENTION

The present invention relates to an antenna device that performs beam formation by radiating a signal while mechanically rotating a primary radiator, and by reflecting it to a predetermined direction by a reflector, and a radar device that detects a target in a transmission direction using the same.

BACKGROUND OF THE INVENTION

Conventionally, the on-vehicle radar device beam-forms a millimeter wave signal for target detection to thereby transmit it to a detection direction, and receives a reflected signal from the target (hereinafter, this signal is referred to as a "target-reflected signal") to thereby detect the target in a detection region. Such a radar device includes a primary radiator that radiates a millimeter wave signal from a predetermined radiation surface, and a reflector that causes the millimeter wave signal radiated from the primary radiator to reflect to the detection direction, or that reflects the target-reflected signal from the detection region to thereby guide it to the primary radiator. Also, in the radar device, in order to detect a target having a predetermined width in the detection region, the beam of the millimeter wave signal must be caused to scan in a predetermined direction, e.g., in a horizontal direction. To this end, a conventional radar device uses an electronic scanning method for electrically scanning the beam of millimeter wave signal to be transmitted, employing a phased array antenna, or a mechanical scanning method for mechanically scanning the beam of millimeter wave signal to be transmitted by rotating/moving the primary radiator or reflector.

As shown in Patent Document 1, in the radar device using the conventional mechanical scanning method, the direction perpendicular to a beam transmission direction is made the direction of a rotating shaft of primary radiators, and primary radiators are arranged on the circumferential surface side of the rotating shaft, from the rotating shaft toward the outside thereof. Furthermore, a reflector is arranged over a predetermined angular range in a location spaced a predetermined distance apart from the rotating shaft. The shape of this reflector is designed so that a millimeter wave signal is transmitted within a desired scanning range. In such a radar device, by causing the signal radiated from the primary radiators to reflect by the reflector, a transmission beam having a directivity in a predetermined direction is formed. By rotating the primary radiator by the rotating shaft, the radiation direction of an electric wave radiated from the primary radiator is rotated, and the reflection direction of the electric wave is changed on the reflector, thereby forming the transmission beam with a predetermined intensity, for scanning within a predetermined angular range.

Patent Document 1: Japanese Patent No. 2693497

However, in an antenna device for the radar device using the conventional mechanical scanning method as shown in the Patent Document 1, for the purpose of forming a beam in the frontward direction of the antenna device, there exists the primary radiator between the reflector and the detection region in the front of the antenna, and simultaneously, the shape of the reflector is configured so as to correspond to a portion of not more than a semicircular surface of the side opposite to the frontward direction of the antenna device, in the circumferential surface that is centered on the primary radiator. As a result, when the primary radiator rotates up to the front side of the antenna device, i.e., up to the side where the reflector is absent, the millimeter wave signal radiated from the primary radiator is directly conveyed to the detection region without being beam-formed, and hence, the signal intensity is so low that this signal cannot be used as a signal for detection. As a consequence, the radiated signal while the primary radiator is not opposed to the reflector is wasted, resulting in reduction in the utilization efficiency, i.e., in radiation efficiency of the primary radiator. Also, since detection cannot be performed while the primary radiator does not face the reflector side, the detection efficiency is reduced.

SUMMARY OF THE INVENTION

Accordingly, the objective of the present invention is to provide an antenna device having superior radiation efficiency, and a radar device equipped with the same and having superior detection efficiency.

The present invention provides an antenna device including a primary radiator that radiates, while rotating, a signal in a direction different from the direction of a rotation axis; and a reflector that reflects the signal radiated by the primary radiator to thereby guide it in a beam transmission direction of the antenna device, and that reflects a target-reflected signal from the beam transmission direction to thereby guide it to the primary radiator, wherein the primary radiator is disposed at an attitude such that the rotation axis direction and the beam transmission direction substantially conform to each other, and simultaneously at an attitude such that the radiation direction of the primary radiator forms an angle of not less than 30 degrees with the rotation axis direction; and wherein the reflector is formed as a bowl-shaped one that covers the primary radiator, and that has an opening surface that opens in the beam transmission direction.

In this arrangement, the center of the radiation direction of a signal radiated from the primary radiator forms a predetermined angle with the beam transmission direction of the antenna device, that is, they are not parallel to each other. The radiated signal is reflected by the reflector and beam-formed to thereby be conveyed in the beam transmission direction. At this time, the rotating shaft direction of the primary radiator and the beam transmission direction are substantially parallel to each other, and simultaneously, the reflector exists around the entire circumference of the rotating shaft of the primary radiator, outside the circumferential surface of the rotating shaft of the primary radiator, so that the signal radiated from the primary radiator is beam-formed irrespective of the rotational angle of the primary radiator, and is conveyed in the beam transmission direction.

The antenna device according to the present invention further includes rotating power generating means for rotating the primary radiator. With this arrangement, by continuing to rotate the primary radiator by the rotating power generating means, a signal is continuously radiated from the primary radiator, and reflected by the reflector to thereby form a transmission beam. That is, a beam is continuously transmitted in the beam transmission direction.

The antenna device according to the present invention further includes an enclosure having therein the primary radiator and the reflector. With this arrangement, by providing the enclosure, each portion of the antenna device is protected from an external environment.

In the antenna device according to the present invention, the enclosure and the reflector are integrated into a single unit. With this arrangement, by the reflector and enclosure being integrated into a single unit, the number of constituent elements of the antenna device is reduced.

A radar device according to the present invention includes any one of the above-described antenna devices; and detection signal generating means that generates a signal radiated by the primary radiator, and that generates a detection signal using the signal radiated by the primary radiator and the target-reflected signal guided by the primary radiator.

With this arrangement, by using the above-described antenna device, the transmission beam of the signal for detection is continuously formed, and simultaneously the target detection signal is continuously received, thereby forming a radar device that continuously detects a desired detection region.

According to the present invention, since the reflector exists around the entire circumference of the rotating shaft of the primary radiator, outside the circumferential surface of the rotating shaft of the primary radiator, the signal radiated from the primary radiator can be beam-formed irrespective of the rotational angle of the primary radiator. This makes it possible to improve the utilization efficiency of the primary radiator, and form an antenna device superior in radiation efficiency.

Also, according to the present invention, by continuing to rotate the primary radiator by the rotational power generating means, a signal can be continuously radiated from the primary radiator to thereby be beam-formed. That is, it is possible to continuously transmit a beam of the signal for detection in the beam transmission direction, and form an antenna device superior in radiation efficiency.

Furthermore, according to the present invention, by providing the enclosure, each portion of the antenna device is protected from the external environment. This produces the effect of having superior radiation efficiency, as well as allows an antenna device superior in durability to be formed.

Moreover, according to the present invention, by the reflector and enclosure being integrated into a single unit, the number of constituent elements of the antenna device is reduced. This produces the effect of having a superior radiation efficiency and further superior durability, and allows an inexpensive antenna device that is easy to manufacture, to be formed.

Also, according to the present invention, by using the above-described antenna device, a radar device that efficiently and continuously detects a desired detection region can be formed.

BRIEF DESCRIPTION OF THE DRAWINGS

FIG. 5(a) to 5(d) are representations showing shapes of various primary radiators.

REFERENCE NUMERALS 1 primary radiator
11 radiation portion
12 transmission portion
2 reflector
3 rotary joint
4 motor
5 waveguide
100 antenna device
200 circulator
300 mixer
400 coupler
401 non-reflecting terminator
500 VCO
600 LNA

DETAILED DESCRIPTION OF THE INVENTION

The antenna device according to a first embodiment of the present invention will be described with reference to FIGS. 1 to 5.

Figure 1:
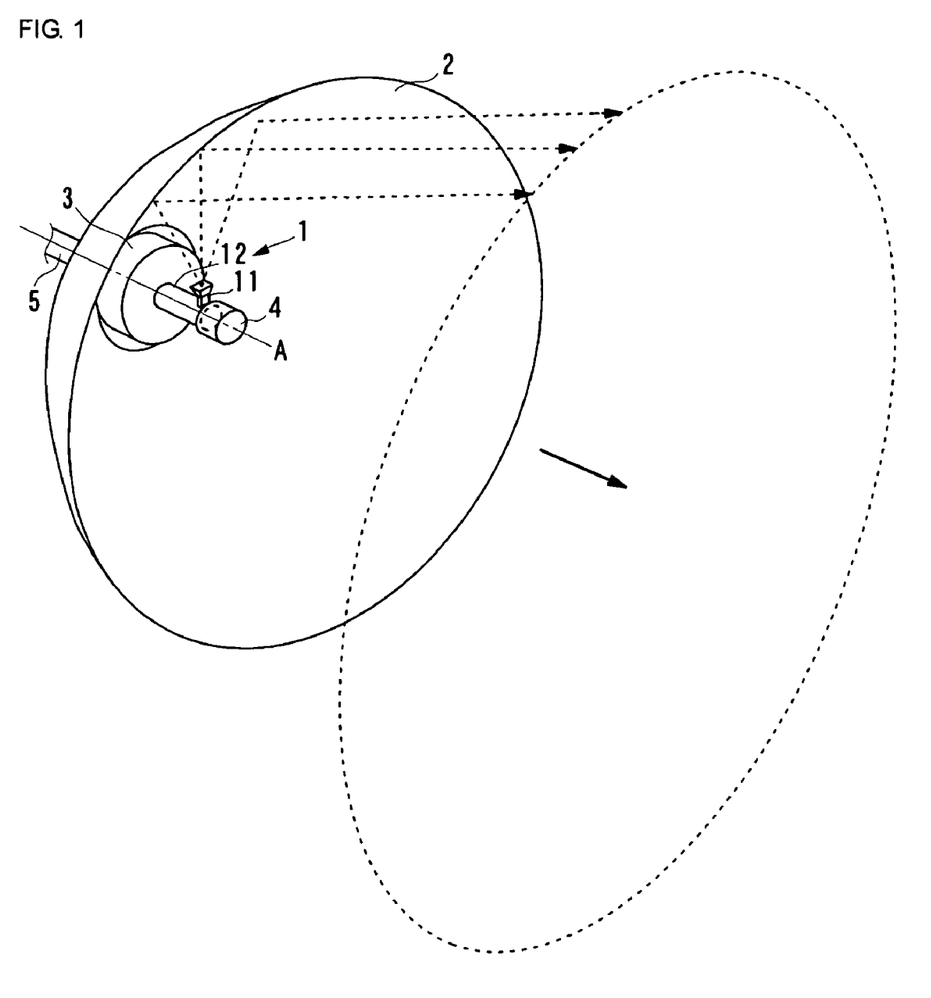
FIG. 1 is an external perspective view showing a schematic construction of an antenna device according to a first embodiment of the present invention.

FIG. 1 is an external perspective view showing a schematic construction of an antenna device according to this embodiment.

Figure 2:
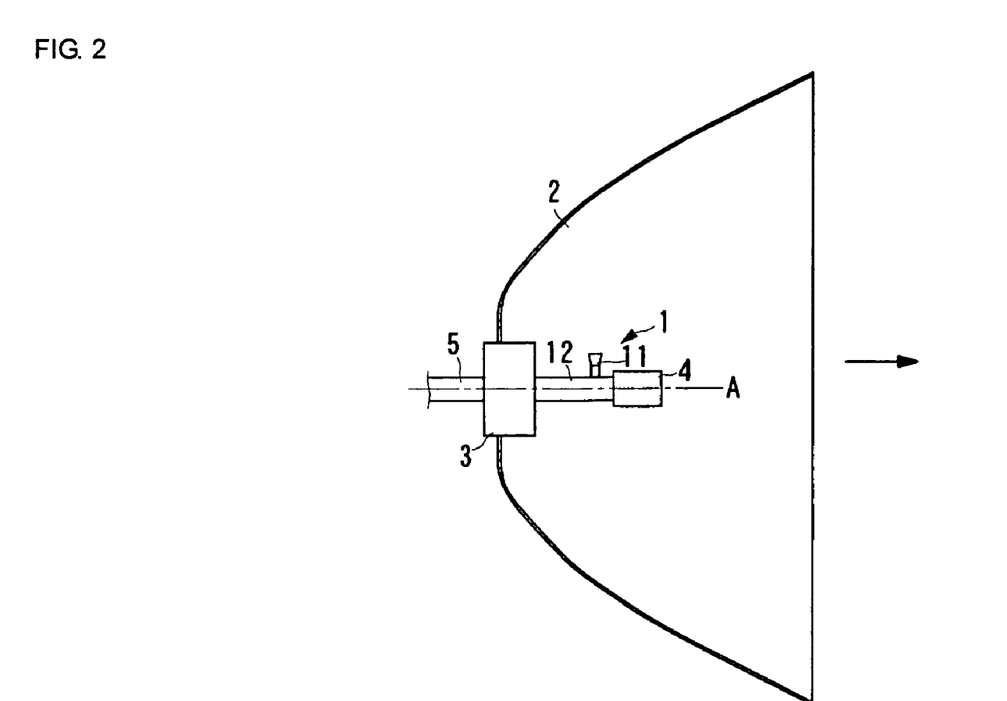
FIG. 2 is a side sectional view showing a schematic construction of an antenna device according to the first embodiment.

FIG. 2 is a side sectional view showing a schematic construction of an antenna device according to this embodiment. In FIGS. 1 and 2, thick solid lines with arrows each indicate the frontward direction of the antenna, and dotted lines with arrows each indicate the radiation direction of millimeter wave signals and the transmission direction of the transmission beam of those millimeter wave signals.

As shown in FIGS. 1 and 2, the antenna device includes a primary radiator 1, reflector 2, rotary joint 3, motor 4 (corresponding to "rotational power generating means" in the present invention), and waveguide 5.

The primary radiator 1 includes a transmission portion 12 formed of a cylindrical waveguide having a predetermined diameter, extending in a direction parallel to the frontward direction of the antenna device, and a radiation portion 11 of a rectangular horn shape, extending in a direction perpendicular to the above-described frontward direction. The radiation portion 11 uses an end face with a larger opening area, of the rectangular horn as a radiation surface, and uses an end face with a smaller opening area as a connection surface with respect to the transmission portion 12. The radiation portion 11 is connected to the transmission portion 12 at a location apart from one end of the transmission portion 12 by a predetermined distance. Here, the radiation portion 11 and transmission portion 12 are mutually connected so that the extending direction of the radiation portion 11 and that of the transmission portion 12 orthogonally intersecting each other. Thereby, the extending direction of the radiation portion 11 of the primary radiator 1 constitutes a direction perpendicular to the frontward direction of the antenna device, and the radiation surface of the primary radiator 1 constitutes a surface perpendicular to the direction perpendicular to the frontward direction of the antenna device. As a result, the center of the radiation direction, of a signal radiated from the primary radiator 1 becomes the direction perpendicular to the frontward direction of the antenna device. Here, the transmission portion 12 may be a coaxial line or circular-section dielectric line.

The end to which the radiation portion 11 of the transmission portion 12 in the primary radiator 1 is not connected is rotatably connected, by a rotary joint 3, to a waveguide 5 of which the center axis in its extending direction conforms to that of the transmission portion 12. On the other hand, to the end to which the radiation portion 11 of the transmission portion 12 is connected, there is provided a motor 4 that rotates the primary radiator 1 with the center axis of the transmission portion 12 as a rotation axis A. Thereby, the primary radiator 1 radiates a signal in a direction perpendicular with respect to the frontward direction of the antenna device (the direction parallel to the above-described rotation axis A), and simultaneously centering about a direction in accordance with the rotational angle. That is, by rotating the primary radiator 1 using the motor 4, the signal can be radiated in directions to the entire periphery of a surface perpendicular to the frontward direction of the antenna device.

The reflector 2 is a bowl shaped one formed by gradually varying the diameter of a circle about the rotation axis of the primary radiator 1 along the rotation axis direction. Specifically, the reflector 2 is formed so that the diameter of the circle gradually increases from the rotary joint 3 side toward the motor 4 side, that is, from the rear side of the antenna device toward the front side thereof, with the front side thereof formed as an opening surface. Also, the reflector 2 is formed into a predetermined curved shape so as to reflect a signal radiated by the primary radiator 1 to thereby beam-form it in a predetermined direction in a detection region in the frontward direction of the antenna device, as well as the reflector 2 is disposed at a predetermined attitude with respect to the primary radiator 1. Thereby, irrespective of the rotational angle of the primary radiator 1, the reflector 2 reflects the signal radiated by the primary radiator 1 to thereby beam-form it.

In the antenna device with such a construction, when a millimeter wave signal for detection is to be transmitted via the waveguide 5, the millimeter wave signal is transmitted to the transmission portion 12 of the primary radiator 1, and radiated from the radiation surface of the radiation portion 11, with the direction perpendicular to the frontward direction of the antenna device as the center of the radiation direction. The millimeter wave signal radiated from the radiation surface of the primary radiator 1 is reflected by the reflector 2 irrespective of the rotational angle of the primary radiator 1. Here, because the primary radiator 1 is continuously rotated by the motor 4, the millimeter wave signal radiated by the primary radiator 1 is continuously reflected by the reflector 2. By the primary radiator 1 rotating over the entire periphery while radiating the millimeter wave signal, a beam having a predetermined spread for detecting a desired forward range is formed, as indicated by a dotted line in FIG. 1.

If there exists a target in the detection region in the antenna frontward direction, by the beam formed by the reflector 2, the transmitted millimeter wave signal is reflected from the target, and transmitted in the antenna device direction. This target-reflected signal is reflected by the reflector 2 and concentratedly received by the radiation surface of the primary radiator 1. At this time, since the reflector 2 exists around the entire periphery of the primary radiator 1, the target-reflected signal is reliably guided irrespectively of the rotational angle of the primary radiator 1. The target-reflected signal is transmitted through the radiation portion 11 and transmission portion 12 of the primary radiator 1, and after having been guided by the waveguide 5, it is outputted from the waveguide 5 to an external circuit.

As described above, the use of the arrangement according to the present embodiment makes it possible to continuously reflect a millimeter wave signal radiated by the primary radiator 1 during its rotation without interruption, and continuously transmit the transmission beam into the desired detection region. Thereby, an antenna device superior in radiation efficiency can be formed. Further, irrespective of the rotational angle of the primary radiator 1, the target-reflected signal can be reliably received over the entire periphery. This allows an antenna device superior in reception efficiency to be formed.

Figure 3:
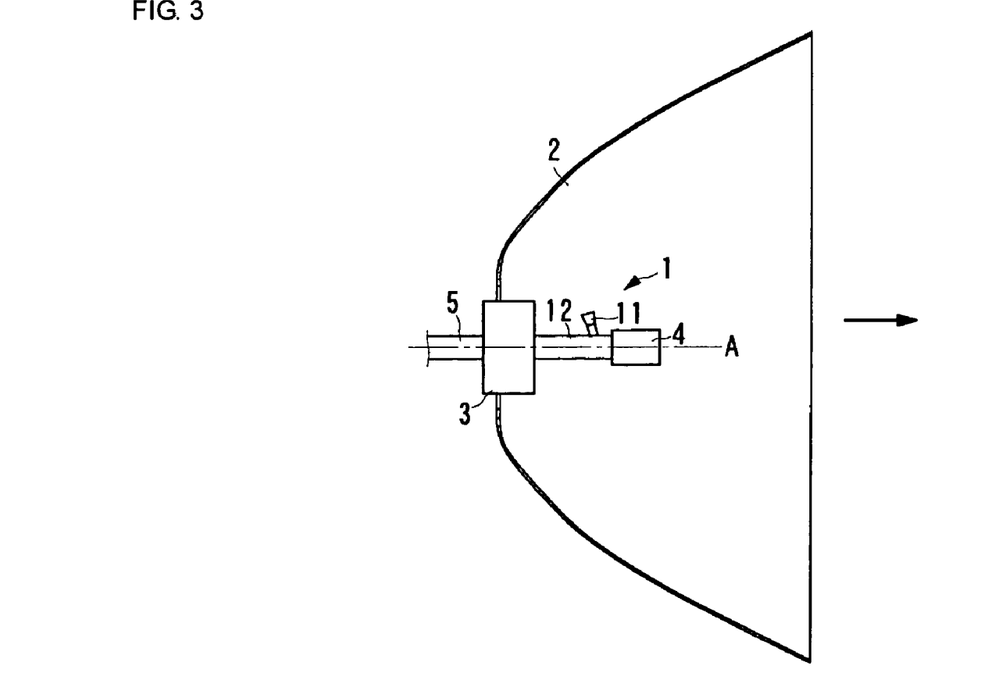
FIG. 3 is a side view showing a relative position relationship between a primary radiator and reflector.

In the above description, an example where the radiation direction of the primary radiator (i.e., the extending direction of the radiation portion 11) is perpendicular to the direction of the rotation axis A (i.e., the frontward direction of the antenna device) was explained, but as shown in FIG. 3, the angle between the radiation direction and the direction of the rotation axis A may be an acute angle that is not practically naught, e.g., an angle of not less than 30° and less than 90°. If the angle between the radiation direction and the rotation axis A is reduced to an angle less than 30°, the size of the reflector becomes too large to radiate a beam within the predetermined detection range.

FIG. 3 is a side view showing a relative position relationship between the primary radiator and reflector. In FIG. 3, a thick solid line with an arrow indicates the frontward direction of the antenna. By this arrangement, the flexibility in the design of a focal length, depth, diameter of the reflector 2 increases, thereby enhancing the flexibility in the layout of the primary radiator and reflector. As a result, an antenna device having a desired antenna characteristic can be easily formed.

Figure 4:
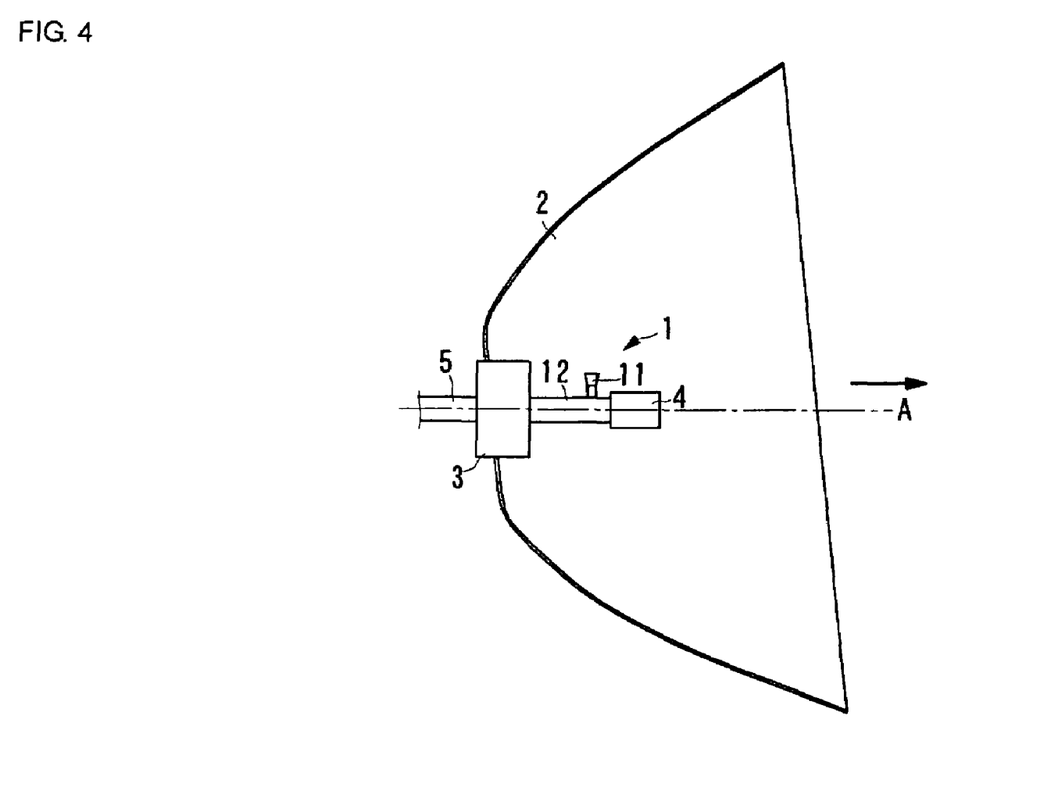
FIG. 4 is a side view showing a relative position relationship between the primary radiator and reflector.

Also, in the above description, an example where the reflector 2 is disposed at an attitude such that the opening surface of the reflector 2 and the rotation axis A of the primary radiator 1 orthogonally intersect each other, was set forth, but as shown in FIG. 4, the reflector 2 may be disposed so that the opening surface of the reflector 2 and the rotation axis A forms a predetermined angle that is not a right angle. Here, FIG. 4 is a side view showing a relative position relationship between the primary radiator 1 and the reflector 2. In FIG. 4, a thick solid line with an arrow indicates the frontward direction of the antenna. By this arrangement, the flexibility in the layout of the reflector increases. As a consequence, an antenna device having a desired antenna characteristic can be easily formed.

Figure 5:
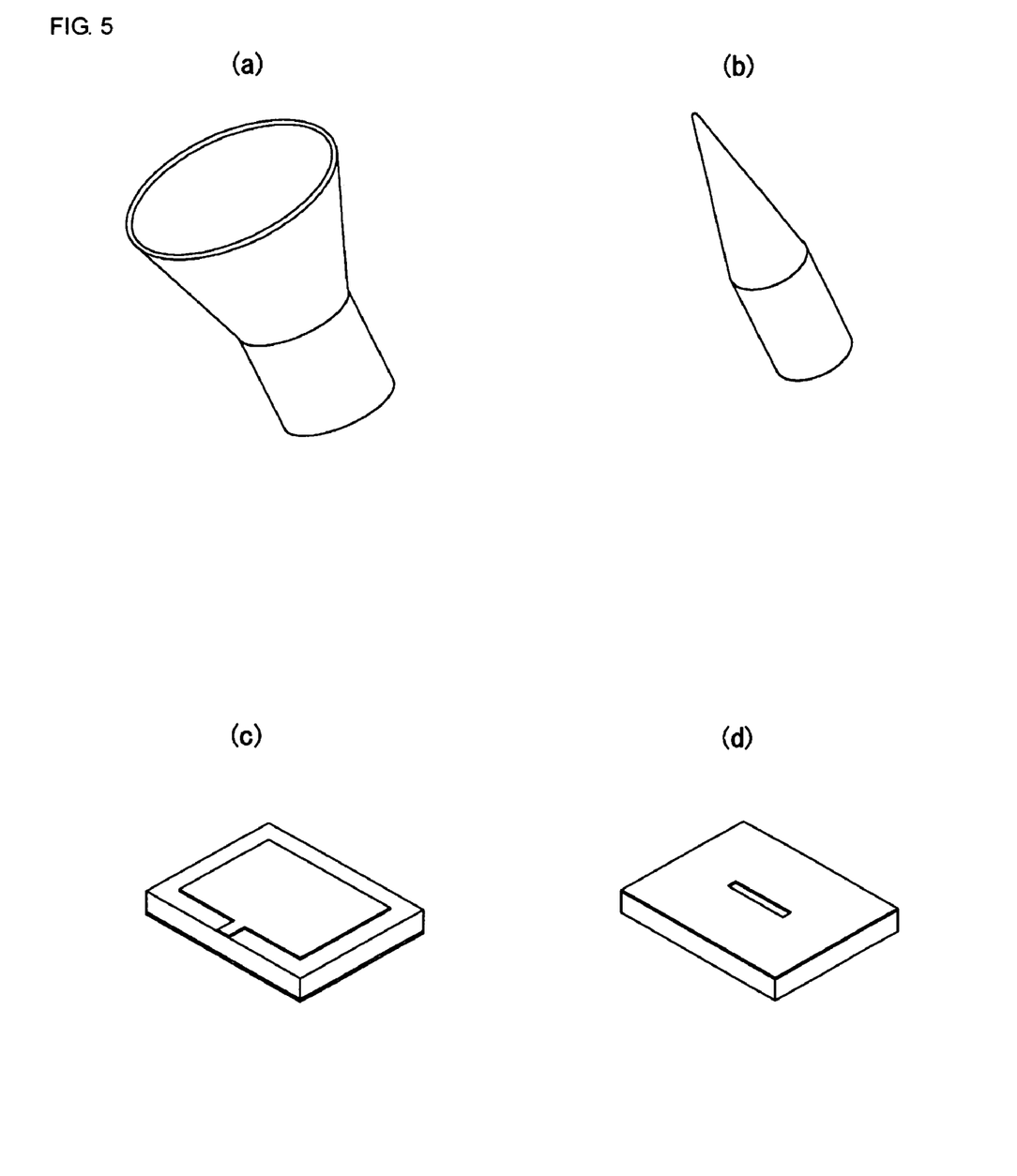

Also, in the above description, an example where the shape of the primary radiator is a rectangular shape was explained, but radiators with various shapes as shown in FIG. 5 may be used.

Here, FIG. 5 shows shapes of various primary radiators, wherein (a) shows a circular horn shaped radiator, (b) shows a dielectric rod radiator, (c) shows a patch antenna, and (d) shows a slot antenna.

The use of the primary radiators with such arrangements allows the above-described effect to be produced, as well.

Next, an antenna device according to a second embodiment of the present invention will be described with reference to FIG. 6.

Figure 6:
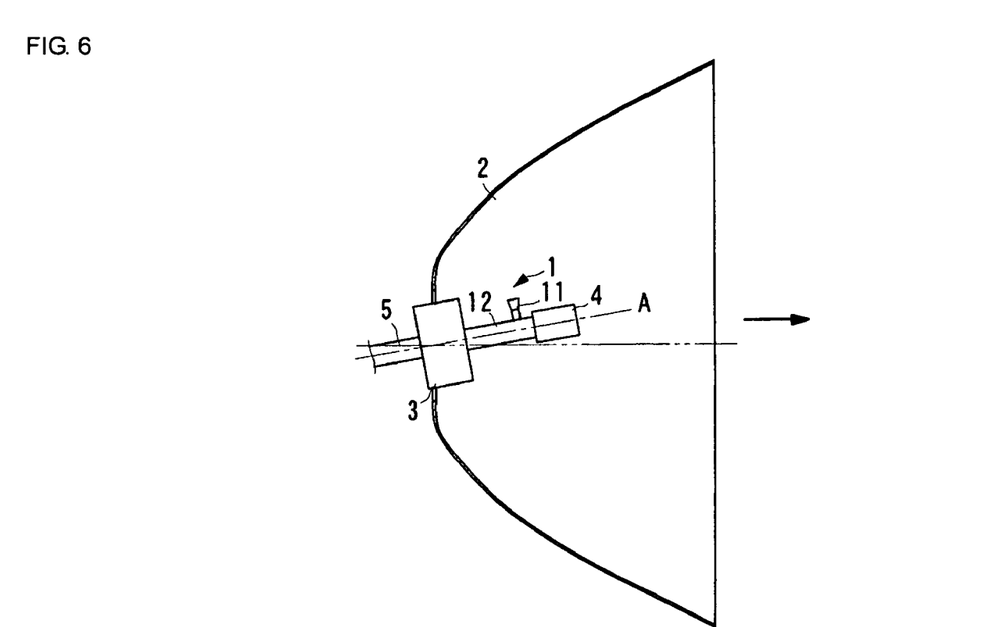
FIG. 6 is a side view showing a schematic construction of an antenna device according to a second embodiment of the present invention.

FIG. 6 is a side view showing a schematic construction of the antenna device according to this embodiment. In FIG. 6, a thick solid line with an arrow indicates the frontward direction of the antenna.

As shown in FIG. 6, in the antenna device according to this embodiment, a primary radiator is disposed so that the direction of the rotation axis A forms a predetermined angle with a horizontal direction, and the other constructions are the same as those of the antenna device shown in the first embodiment. With such an arrangement, the present invention allows the flexibility of the relative attitude between the primary radiator and reflector, i.e., the flexibility of the layout of each constituent element of the antenna device to be improved.

Next, an antenna device according to a third embodiment of the present invention will be described with reference to FIG. 7.

Figure 7:
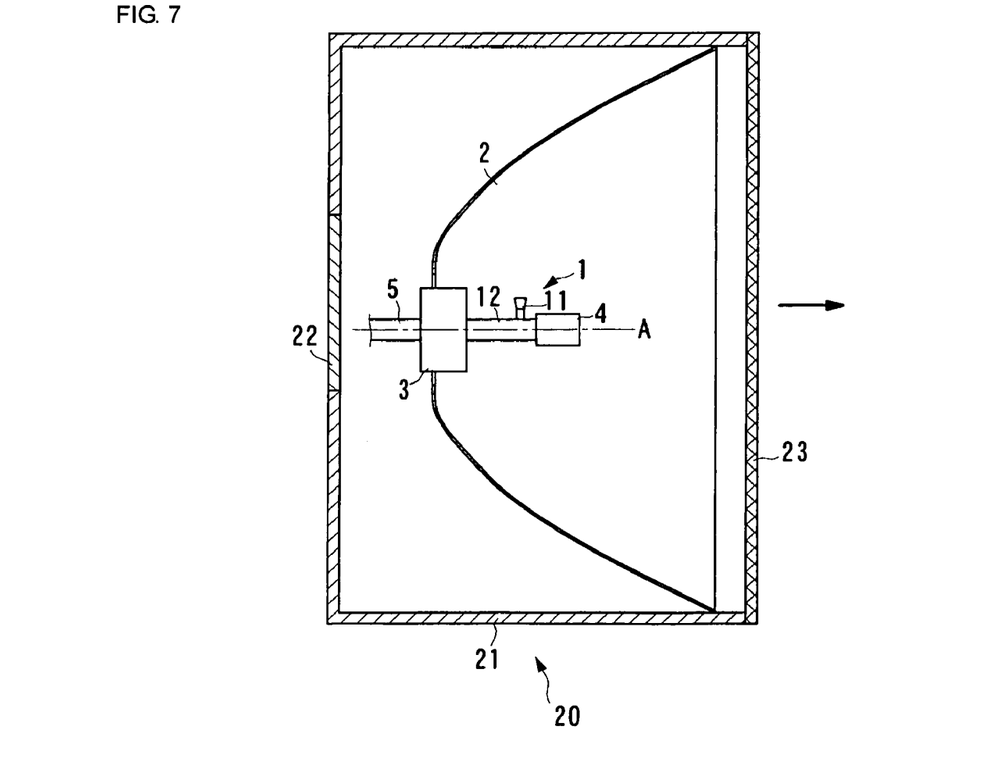
FIG. 7 is a side view showing a schematic construction of an antenna device according to a third embodiment of the present invention.

FIG. 7 is a side view showing a schematic construction of the antenna device according to this embodiment. In FIG. 7, a thick solid line with an arrow indicates the frontward direction of the antenna.

As shown in FIG. 7, the antenna device according to this embodiment has an enclosure 20 incorporating the primary radiator 1, reflector 2, rotary joint 3, motor 4, and waveguide 5, and the other constructions are the same as those of the antenna device shown in the first embodiment. The enclosure 20 comprises a side wall portion 21 that covers each of the above-described constituent elements from up-and-down directions and right-and-left directions, a rear lid 22 that covers the rear side of the antenna device, and a radome 23 that covers the front side of the antenna device. Here, the side wall portion 21 of the enclosure 20 and the reflector 2 are integrally formed.

With such an arrangement, the present invention allows each of the constituent elements of the antenna device to be protected from the external environment, and an antenna device superior in durability to be formed. Moreover, since the enclosure and the reflector are integrated into a single unit, the number of constituent elements of the antenna device is reduced, so that an inexpensive antenna device that is easy to manufacture can be formed.

In this embodiment, an example where the reflector and enclosure are integrated into a single unit was described, but the reflector and enclosure may be assembled after having been each individually formed.

Also, in this embodiment, each of the constituent elements (each function portion) of the antenna device has been incorporated into the enclosure, but each functional portion of a radar device described below may be arranged in the enclosure. This allows an antenna device superior in durability to be achieved.

Figure 8:
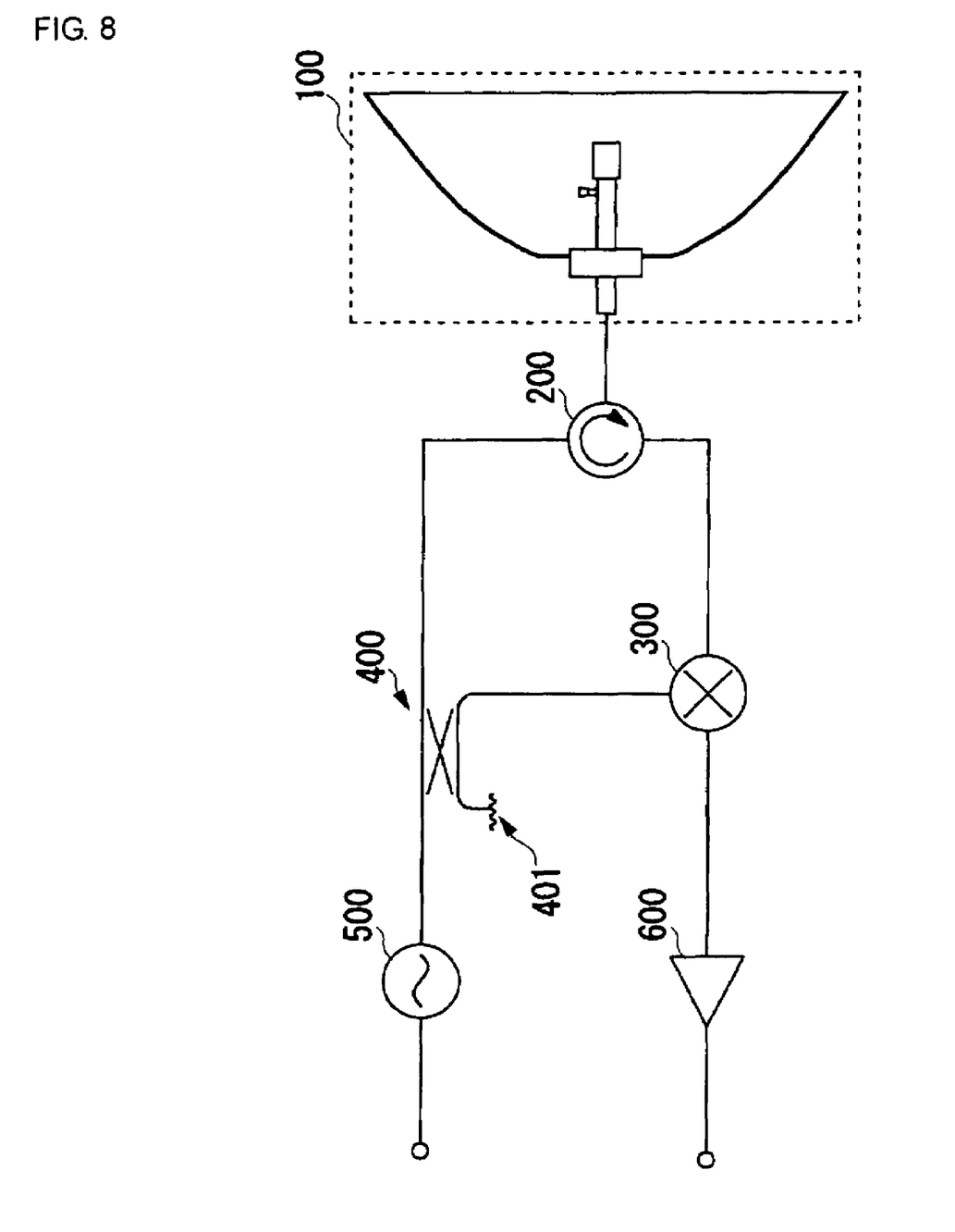
FIG. 8 is a block diagram showing a schematic construction of an antenna device according to a fourth embodiment of the present invention.

Next, a radar device according to a fourth embodiment of the present invention will be described with reference to FIG. 8. FIG. 8 is a block diagram showing a schematic construction of the antenna device according to the fourth embodiment.

As shown in FIG. 8, the radar device according to this embodiment includes antenna device 100, circulator 200, mixer 300, coupler 400, non-reflecting terminator 401, VCO 500, and LNA 600. For the antenna device 100, any one of the antenna devices shown in the above-described embodiments is used. Here, the circulator 200, mixer 300, coupler 400, non-reflecting terminator 401, VCO 500, and LNA 600 correspond to the "detection signal generating means" according to the present invention.

A millimeter wave signal generated by the VCO 500 is transmitted to the antenna device 100 through the coupler 400 and circulator 200. As described above, the antenna device 100 forms a transmission beam in the target detection region, and receives a target detection signal reflected from the target. The target detection signal received by the antenna device 100 is inputted into the mixer 300 via the circulator 200. The mixer 300 inputs a part of the signal from the VCO 500 as a local signal via the coupler 400, and outputs a frequency component of the difference between the target detection signal and local signal as an IF signal. Then, the LNA 600 amplifies this IF signal, and outputs it to a detection data generating circuit (not shown) at a subsequent stage.

Thus, by forming a radar device equipped with the above-described antenna device superior in radiation efficiency and reception efficiency, it is possible to continuously transmit the transmission beam into the detection region, and continuously receive the target detection signal from the detection region, thereby allowing a radar device superior in detection efficiency to be formed.

Furthermore, as described above, by arranging the constituent elements such as the circulator 200, mixer 300, coupler 400, non-reflecting terminator 401, VCO 500, and LNA 600 that constitute the radar device, in the enclosure of the antenna device, it is possible to achieve an antenna device superior in durability.

The invention claimed is:

1. An antenna device comprising:
    a rotatable primary radiator that radiates a signal in a direction different from a rotation axis direction thereof; and
    a reflector that reflects the signal radiated by the primary radiator to thereby guide it in a beam transmission direction of the antenna device, and that reflects a target-reflected signal from the beam transmission direction to thereby guide it to the primary radiator,
    wherein the primary radiator is disposed at an attitude such that the rotation axis direction and the beam transmission direction substantially conform to each other, and the radiation direction of the primary radiator forms an angle of not less than 30 degrees with respect to the rotation axis direction; and
    wherein the reflector is bowl-shaped so as to cover the primary radiator, and define an opening surface that opens in the beam transmission direction.

2. The antenna device according to claim 1, wherein the primary radiator includes a transmission portion and a radiation portion.

3. The antenna device according to claim 2, wherein the radiation portion is one of a rectangular horn, a circular horn, a dielectric rod radiator, a patch antenna and a slot antenna.

4. The antenna device according to claim 2, wherein the radiation portion extends in a direction substantially perpendicular to the rotation axis direction.

5. The antenna device according to claim 1, wherein the reflector is disposed such that the opening surface of the reflector is substantially at a right angle relative to the rotation axis direction.

6. The antenna device according to claim 1, wherein the reflector is disposed such that the opening surface of the reflector is substantially at an angle other than a right angle relative to the rotation axis direction.

7. The antenna device according to claim 1, further comprising a rotating power generating means for rotating the primary radiator.

8. The antenna device according to claim 7, wherein the rotating power generating means is a motor.

9. The antenna device according to claim 1, further comprising an enclosure having therein the primary radiator and the reflector.

10. The antenna device according to claim 9, wherein the enclosure and the reflector are integrated into a single unit.

11. A radar device comprising:

the antenna device as recited in claim 1; and a detection signal generator generating a signal radiated by the primary radiator, and generating a detection signal using the signal radiated by the primary radiator and the target-reflected signal guided by the primary radiator.

\* \* \* \* \*